(12) United States Patent
Furukawa et al.

(10) Patent No.: US 8,967,120 B2
(45) Date of Patent: Mar. 3, 2015

(54) ENGINE CONTROL SYSTEM

(71) Applicant: Hino Motors, Ltd., Tokyo (JP)

(72) Inventors: Takatoshi Furukawa, Hino (JP); Hideki Kato, Hino (JP); Shotaro Iikubo, Hino (JE)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 14/350,848

(22) PCT Filed: Sep. 21, 2012

(86) PCT No.: PCT/JP2012/074254
§ 371 (c)(1),
(2) Date: Apr. 10, 2014

(87) PCT Pub. No.: WO2013/054650
PCT Pub. Date: Apr. 18, 2013

(65) Prior Publication Data
US 2014/0299097 A1 Oct. 9, 2014

(30) Foreign Application Priority Data

Oct. 14, 2011 (JP) ................. 2011-227067

(51) Int. Cl.
*F02D 13/06* (2006.01)
*F02D 17/02* (2006.01)
*F02D 41/00* (2006.01)
(Continued)

(52) U.S. Cl.
CPC ............... *F02D 17/02* (2013.01); *F02D 13/06* (2013.01); *F02D 41/0087* (2013.01); *F02D 41/042* (2013.01); *F02D 41/0005* (2013.01); *Y02T 10/42* (2013.01); *Y02T 10/18* (2013.01)

USPC ..................................... 123/481; 123/90.15

(58) Field of Classification Search
USPC ......... 123/481, 325, 332, 198 F, 344, 568.13, 123/568.14, 568.15, 90.15; 701/112
See application file for complete search history.

(56) References Cited

U.S. PATENT DOCUMENTS 4,572,114 A * 2/1986 Sickler ........................... 123/21
6,325,043 B1 * 12/2001 Meistrick et al. ............. 123/321
6,431,154 B1 8/2002 Inoue
(Continued)

FOREIGN PATENT DOCUMENTS

CN  1782349   6/2006
CN  101149003  3/2008
(Continued)

OTHER PUBLICATIONS

JP 2008-75569 A (Kuze et al.) Apr. 3, 2008 (machine translation) [online]. Retrieved on Jul. 21, 2014 from JPO.*
(Continued)

*Primary Examiner* — Mahmoud Gimie
(74) *Attorney, Agent, or Firm* — Sheridan Ross P.C.

(57) ABSTRACT

An engine control system controls an internal combustion engine so that some of a plurality of cylinders in a multi-cylinder internal combustion engine are made to rest and reduced-cylinder operation takes place. Each cylinder comprises a piston, an intake valve and an exhaust valve. In a resting cylinder during reduced-cylinder operation, when the piston moves downwards, the engine control system opens both the intake valve and the exhaust valve, and when the piston moves upwards, the engine control system opens the intake valve and closes the exhaust valve.

6 Claims, 3 Drawing Sheets

(51) Int. Cl.
*F02D 41/04* (2006.01)
*F02D 13/00* (2006.01)

(56) References Cited

U.S. PATENT DOCUMENTS

2004/0089250 A1* 5/2004 Iwashita et al. ............ 123/21
2008/0072869 A1  3/2008 Maehara et al.

FOREIGN PATENT DOCUMENTS

| JP | 2001-132484 A | 5/2001 |
| JP | 2006-144634 A | 11/2004 |
| JP | 2006-70869 A | 3/2006 |
| JP | 2008075569 A * | 4/2008 |

OTHER PUBLICATIONS

International Search Report prepared by the Japanese Patent Office on Oct. 9, 2012, for International Application No. WO 2013/054650.
Official Action for Chinese Patent Application No. 200021, mailed Aug. 19, 2014, 5 pages.

* cited by examiner

Fig.4

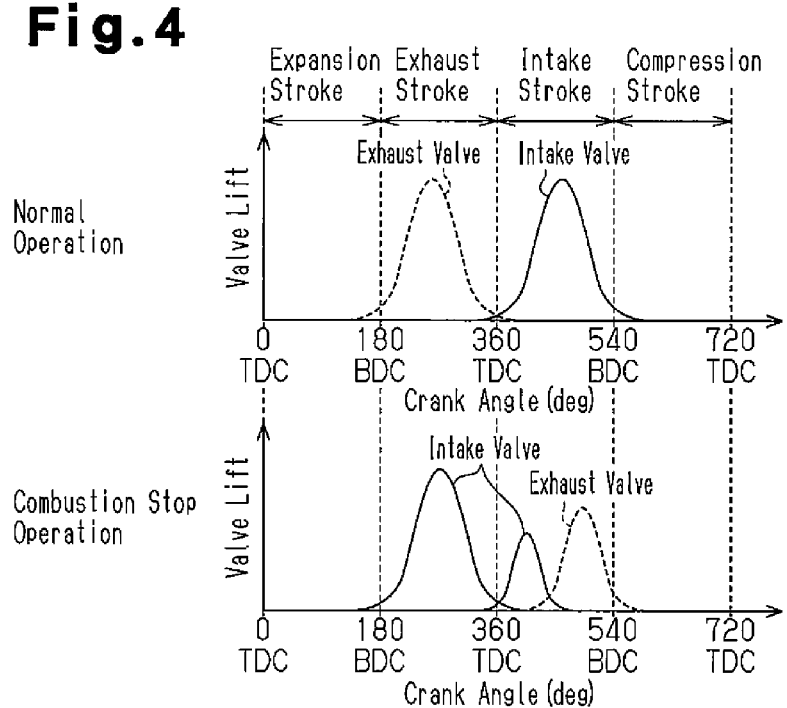

Fig.5

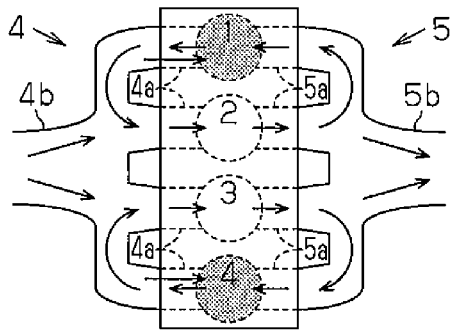

Fig.6

| ⟨All Cylinder Operation⟩ | | 0 | 180 | 360 | 540 | 720 |
|---|---|---|---|---|---|---|
| First Cylinder | Combustion | Expansion | Exhaust | Intake | Compression | |
| Second Cylinder | Combustion | Exhaust | Intake | Compression | Expansion | |
| Third Cylinder | Combustion | Compression | Expansion | Exhaust | Intake | |
| Fourth Cylinder | Combustion | Intake | Compression | Expansion | Exhaust | |

| ⟨Cylinder Deactivation⟩ | | 0 | 180 | 360 | 540 | 720 |
|---|---|---|---|---|---|---|
| First Cylinder | Stop | Expansion | Exhaust | Intake | Compression | |
| Second Cylinder | Combustion | Exhaust | Intake | Compression | Expansion | |
| Third Cylinder | Combustion | Compression | Expansion | Exhaust | Intake | |
| Fourth Cylinder | Stop | Intake | Compression | Expansion | Exhaust | |

Fig.7

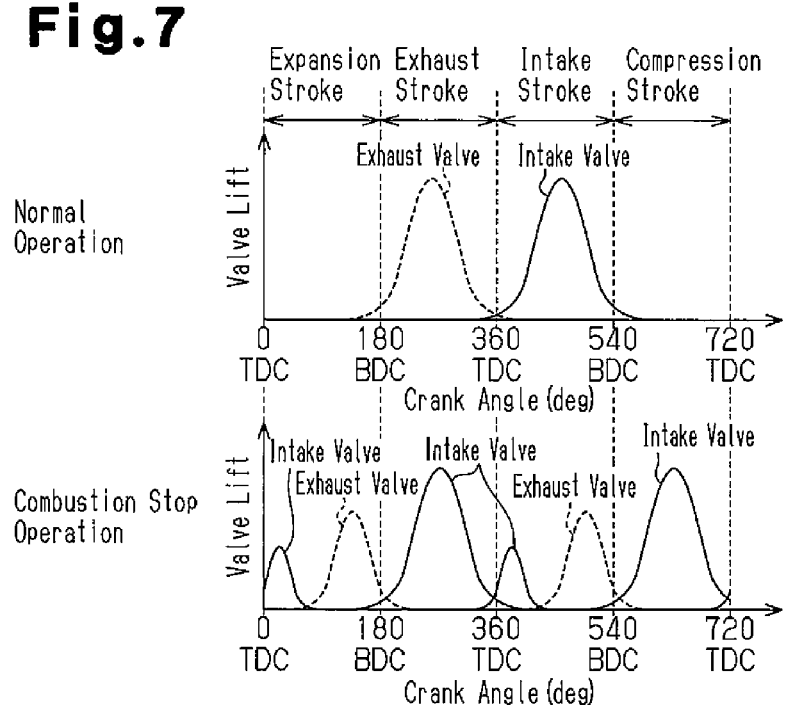

Fig.8

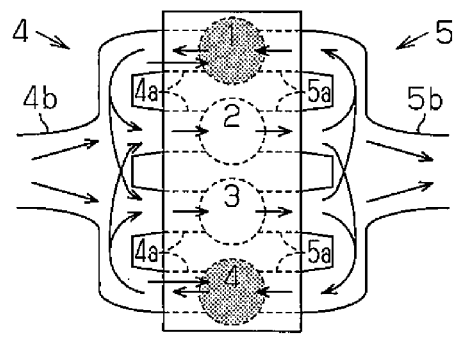

Fig.9

<All Cylinder Operation>

| | | 0 | 180 | 360 | 540 | 720 |
|---|---|---|---|---|---|---|
| First Cylinder | Combustion | Expansion | Exhaust | Intake | Compression | |
| Second Cylinder | Combustion | Exhaust | Intake | Compression | Expansion | |
| Third Cylinder | Combustion | Compression | Expansion | Exhaust | Intake | |
| Fourth Cylinder | Combustion | Intake | Compression | Expansion | Exhaust | |

<Cylinder Deactivation>

| | | 0 | 180 | 360 | 540 | 720 |
|---|---|---|---|---|---|---|
| First Cylinder | Stop | Intake | Exhaust | Intake | Exhaust | |
| Second Cylinder | Combustion | Exhaust | Intake | Compression | Expansion | |
| Third Cylinder | Combustion | Compression | Expansion | Exhaust | Intake | |
| Fourth Cylinder | Stop | Intake | Exhaust | Intake | Exhaust | |

ENGINE CONTROL SYSTEM

CROSS-REFERENCE TO RELATED APPLICATIONS

This application is a national stage application under 35 U.S.C. 371 and claims the benefit of PCT Application No. PCT/JP2012/074254 filed 21 Sep. 2012, which designated the United States, which PCT Application claimed the benefit of Japanese Patent Application No. 2011-227067 filed on 14 Oct. 2011, the disclosure of each of which are incorporated herein by reference.

FIELD OF THE INVENTION

The present invention relates to an engine control system, and more particularly, to a control system that controls opening and closing of an intake valve and opening and closing of an exhaust valve in a deactivated cylinder during cylinder deactivation.

BACKGROUND OF THE INVENTION

Some conventional internal combustion engines provided with a plurality of cylinders are capable of all cylinder operation and cylinder deactivation. In all cylinder operation, fuel is combusted in all of the cylinders. In cylinder deactivation, fuel is combusted only in some of the cylinders and combustion stops in the remaining cylinders. For example, Patent Document 1 discloses an internal combustion engine that, in a deactivated cylinder, closes the intake valve and opens the exhaust valve during the intake stroke, and opens the intake valve and closes the exhaust valve during the exhaust stroke. In this way, exhaust gas from the exhaust manifold is supplied to the intake manifold.

PRIOR ART DOCUMENTS

Patent Documents

Patent Document 1: Japanese Laid-Open Patent Publication 2006-144634

SUMMARY OF THE INVENTION

Such an internal combustion engine supplies exhaust gas from a combustion cylinder, in which fuel is combusted, to a deactivated cylinder. Thus, the exhaust gas at a high-temperature immediately after combustion is drawn into the deactivated cylinder. This may promote the evaporation of lubricant supplied in the deactivated cylinder even though fuel is not combusted in the cylinder. For this reason, there is a need for an engine control system that recirculates the exhaust gas to an intake passage while reducing evaporation of the lubricant.

It is an object of the present invention to provide an engine control system that recirculates exhaust gas to an intake passage while reducing evaporation of the lubricant.

To achieve the above object, one aspect of the present invention provides an engine control system for controlling an internal combustion engine to perform cylinder deactivation, which deactivates some of a plurality of cylinders in a multi-cylinder internal combustion engine. Each cylinder includes a piston, an intake valve, and an exhaust valve. In a deactivated cylinder during the cylinder deactivation, the engine control system opens both the intake valve and the exhaust valve during downstroke of the piston, and opens the intake valve and closes the exhaust valve during upstroke of the piston.

BRIEF DESCRIPTION OF THE DRAWINGS

FIG. 4 is a graph showing valve timing during normal operation and combustion stop operation;

FIG. 5 is a diagram showing flows of intake gas and exhaust gas in the internal combustion engine during cylinder deactivation;

FIG. 6 is a table showing an operational process of each cylinder during normal operation and cylinder deactivation;

FIG. 7 is a graph showing valve timing during normal operation and combustion stop operation;

FIG. 8 is a diagram showing flows of intake gas and exhaust gas in the internal combustion engine during cylinder deactivation; and FIG. 9 is a table showing an operational process of each cylinder during normal operation and cylinder deactivation.

DETAILED DESCRIPTION OF THE PREFERRED EMBODIMENTS

First Embodiment

Figure 2:
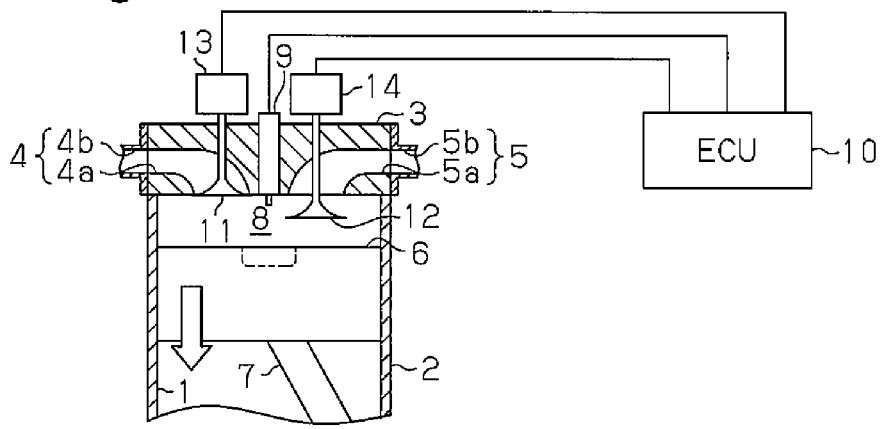
FIG. 2 is a schematic block diagram showing a state of the valves and the internal combustion engine during downstroke of the piston.
Figure 3:
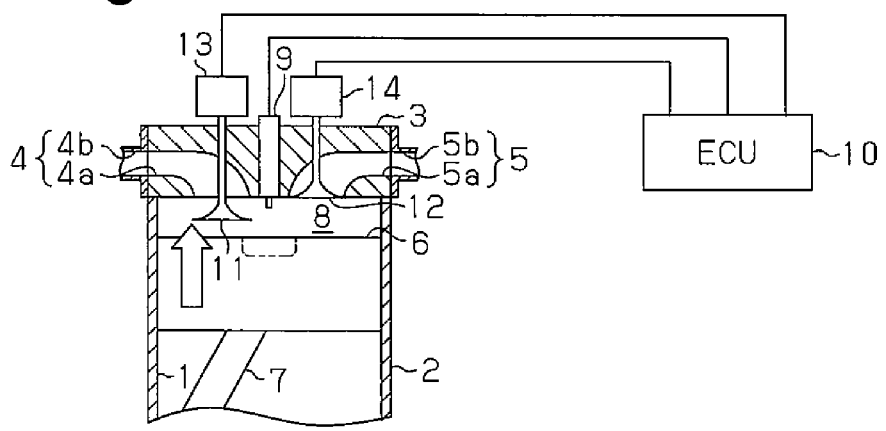
FIG. 3 is a schematic block diagram showing a state of the valves and the internal combustion engine during upstroke of the piston.

A control system for a diesel engine according to a first embodiment of the present invention will now be described referring to FIGS. 1 to 6. The diesel engine in the present embodiment is an in-line four cylinder diesel engine. Each of FIGS. 1 to 3 shows a drive mode in a cylinder as an example of the four cylinders in the diesel engine.

Figure 1:
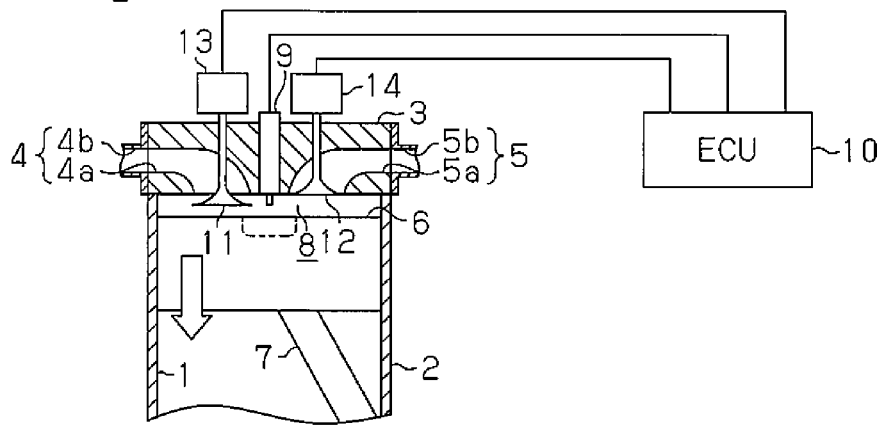
FIG. 1 is a schematic block diagram showing a state of valves and an internal combustion engine during downstroke of a piston.

As shown in FIG. 1, a cylinder block 2, on which a cylinder head 3 is mounted, contains four cylinders 1. The cylinder head 3 has an intake passage 4 and an exhaust passage 5, which are connected to each cylinder 1. A piston 6 is arranged in each cylinder 1. The piston 6 is capable of reciprocation by a crank 7. The piston 6 and the cylinder head 3 define a combustion chamber 8.

The intake passage 4 includes an intake port 4a, on which two intake valves 11 are mounted. The exhaust passage 5 includes an exhaust port 5a, on which two exhaust valves 12 are mounted. Each intake valve 11 is connected to and actuated by an intake valve drive unit 13. Each exhaust valve 12 is connected to and actuated by an exhaust valve drive unit 14. When the intake valve 11 is not actuated by the intake valve drive unit 13, the intake valve 11 is actuated by an intake cam (not shown), which rotates along with a crankshaft (not shown). When the exhaust valve 12 is not actuated by the exhaust valve drive unit 14, the exhaust valve 12 is actuated by an exhaust cam (not shown), which rotates along with a crankshaft (not shown).

An injector 9 is mounted on the cylinder head 3 and injects fuel into the combustion chamber 8. An intake manifold 4b is connected to the intake port 4a and connects the intake port 4a with the other intake ports 4a. An exhaust manifold 5b is connected to the exhaust port 5a and connects the exhaust port 5a with the other exhaust ports 5a.

An engine control unit (ECU) 10, which is a control system that performs various types of control for the diesel engine, is connected to the injector 9, the intake valve drive unit 13, and the exhaust valve drive unit 14. In all cylinder operation, in which fuel is combusted in all the cylinders, the ECU 10 deactivates valve actuation by the intake and exhaust valve drive units 13 and 14, so that the intake and exhaust valves 11 and 12 are each actuated by the corresponding cam. In cylinder deactivation, in which fuel is combusted only in some of the cylinders, the ECU 10 stops injection of fuel, for example, in two of the cylinders 1. Thus, exhaust gas is introduced from the exhaust manifold 5b to the intake manifold 4b through the two deactivated cylinders, in which fuel is not combusted, and mixed with intake air. This process is known as exhaust gas recirculation (EGR). At this time, the ECU 10 moves the cams to positions where each of the cams does not actuate the corresponding one of the intake and exhaust valves 11 and 12. Then, the intake and exhaust valve drive units 13 and 14 actuate the intake and exhaust valves 11 and 12.

Valve control performed in a deactivated cylinder by the ECU 10 during cylinder deactivation will now be described.

As shown in FIG. 1, when the piston 6 begins downstroke from the top dead center (TDC) or moves to near the top dead center, the ECU 10 starts opening the intake valve 11. Then, as shown in FIG. 2, during downstroke of the piston 6, the ECU 10 closes the intake valve 11 and starts opening the exhaust valve 12. When the piston 6 reaches near the bottom dead center (BDC), the ECU 10 closes the exhaust valve 12. As shown in FIG. 3, when the piston 6 begins upstroke from the bottom dead center (BDC) or moves to near the bottom dead center, the ECU 10 opens the intake valve 11. After that, when the piston 6 ascends to or near the top dead center (TDC) or descends a little bit from the top dead center, the ECU 10 closes the intake valve 11. "Upstroke of the piston 6" refers to "movement of the piston 6 toward the top dead center." "Downstroke of the piston 6" refers to "movement of the piston 6 toward the bottom dead center."

The aforementioned operational modes of the valve control by the ECU 10 will be described in detail referring to the relationship between the opening amount of each valve and the crank angle.

Normal Operation

A mode of valve control in a cylinder under normal operation will be described in order of intake, compression, expansion, and exhaust strokes. In the cylinder under normal operation, fuel is combusted, and the intake and exhaust valves 11 and 12 are actuated by the cams. The cylinder here is a first cylinder by way of example. The intake, compression, expansion, and exhaust strokes are executed in the cylinder under normal operation in accordance with the crank angle. In what follows, the same stroke names will be also used for strokes associated with the same crank angle in a cylinder under combustion stop operation, for the purpose of illustration.

As shown in the upper part of FIG. 4, in the intake stroke with a crank angle of from approximately 360 to approximately 540 degrees, the ECU 10 injects fuel into the combustion chamber 8 of the cylinder under normal operation, and opens the intake valve 11 to draw fresh air into the combustion chamber 8 of the same cylinder. In the compression stroke with a crank angle of from approximately 540 to 720 degrees, the ECU 10 keeps the intake valve 11 and the exhaust valve 12 closed. This compresses gas in the combustion chamber 8, and thereby the gas is agitated.

Then, in the expansion stroke with a crank angle of from 0 to approximately 180 degrees, the ECU 10 also keeps the intake valve 11 and the exhaust valve 12 closed. Thus, the gas in the combustion chamber 8 expands by downward movement of the piston 6. In the exhaust stroke with a crank angle of from approximately 180 to approximately 360 degrees, the ECU 10 opens the exhaust valve 12 to discharge the gas from the combustion chamber 8.

Combustion Stop Operation

A mode of valve control in a cylinder, in which combustion stops, that is a deactivated cylinder, during cylinder deactivation will be described in order of the intake, compression, expansion, and exhaust strokes. The deactivated cylinder here is the first cylinder by way of example.

As shown in the lower part of FIG. 4, when the crank angle is from approximately 360 to approximately 540 degrees, the ECU 10 opens the intake valve 11 in the deactivated cylinder under combustion stop operation by an opening amount that is smaller than that of the intake valve 11 under normal operation in the intake stroke. After closing the intake valve 11, the ECU 10 opens the exhaust valve 12 by an opening amount that is smaller than that of the exhaust valve 12 under normal operation in the exhaust stroke. The ECU 10 then closes the exhaust valve 12. Thus, in the intake stroke of the deactivated cylinder, fresh air is drawn into the combustion chamber 8 through the intake passage 4, and then exhaust gas is drawn into the combustion chamber 8 through the exhaust passage 5. In FIG. 4, the exhaust valve 12 begins opening before the intake valve 11 is completely closed. That is, the intake valve 11 is nearly closed, and thereafter the exhaust valve 12 opens.

Thus, an opening operation and a subsequent closing operation are performed by both the intake valve 11 and the exhaust valve 12 during downstroke of the piston 6 in the deactivated cylinder during cylinder deactivation. At this time, the exhaust valve 12 lags behind the intake valve 11 in the opening operation and the subsequent closing operation. Each valve moves toward the full open position in the opening operation, and each valve moves toward the complete closed position in the closing operation.

At this time, the ECU 10 adjusts the opening amounts of the intake and exhaust valves 11 and 12 in the deactivated cylinder in the intake stroke. The ratio of exhaust gas drawn from the exhaust passage 5 out of intake gas drawn into the combustion cylinder is thereby adjustable. In particular, when increasing the ratio of the exhaust gas out of the intake gas drawn into the combustion cylinder according to the combustion state of the combustion cylinder in the intake stroke in the deactivated cylinder, the ECU 10 increases the opening amount of the exhaust valve 12 to be greater than that of the intake valve 11. The opening amount is determined by the valve lift amount and opening time, and has a value obtained by integrating the lift amount with respect to time.

While the crank angle is between approximately 540 and 720 degrees, the ECU 10 keeps the intake valve 11 and the exhaust valve 12 closed as in the compression stroke under normal operation. Thus, fresh air and exhaust gas that have been supplied into the combustion chamber 8 in the previous intake stroke are compressed, and are thereby mixed. The gas obtained by mixing the fresh air and exhaust gas in the cylinder 1 is referred to as in-cylinder mixed intake gas.

While the crank angle is between 0 and approximately 180 degrees, the ECU 10 keeps the intake valve 11 and the exhaust valve 12 closed as in the expansion stroke under normal operation. The in-cylinder mixed intake gas in the combustion chamber 8, in which the fresh air and exhaust gas are mixed, expands and is thereby agitated.

When the crank angle is between approximately 180 and approximately 360 degrees, the ECU 10 opens the intake valve 11 by an opening amount that is substantially equal to that of the exhaust valve 12 under normal operation in the exhaust stroke. The ECU 10 then closes the intake valve 11. The in-cylinder mixed intake gas in the combustion chamber 8, in which the fresh air and exhaust gas are mixed, is discharged from the combustion chamber 8 to the intake passage 4.

As above, the intake valve 11 is opened and the exhaust valve 12 is closed during upstroke of the piston 6 in the deactivated cylinder during cylinder deactivation. More particularly, an opening operation and a subsequent closing operation are performed only by the intake valve 11 during upstroke of the piston 6.

Through the above stroke cycle, the pressure in the exhaust passage 5 becomes higher than the pressure in the intake passage 4. When exhaust gas is drawn in from the exhaust passage 5, and when the in-cylinder mixed intake gas is discharged to the intake passage 4, the gas performs, on the piston 6, work that corresponds to the pressure difference between the intake gas and exhaust gas. This improves the fuel efficiency of the diesel engine.

A combustion state in a cylinder under normal operation during the above cylinder deactivation will be described referring to FIGS. 5 and 6. Four cylinders are illustrated by dashed circles in FIG. 5. The cylinders are a first cylinder, a second cylinder, a third cylinder, and a fourth cylinder from top down, and numbered as 1, 2, 3, and 4 in that order. In what follows, the first cylinder and the fourth cylinder are deactivated cylinders among the four cylinders, and they are illustrated with shading. The table in FIG. 6 shows a process in each of the four cylinders according to crank angles.

During the cylinder deactivation, the in-cylinder mixed intake gas in the deactivated cylinder is supplied to the intake passage 4. Through the intake manifold 4b, the in-cylinder mixed intake gas is supplied to a combustion cylinder, in which fuel is combusted, from the deactivated cylinder. That is, when the first cylinder is in the exhaust stroke, the second cylinder in the intake stroke draws in the in-cylinder mixed intake gas together with fresh air. The mixed intake gas including the exhaust gas is supplied to the second cylinder. Similarly, when the fourth cylinder is in the exhaust stroke, the third cylinder in the intake stroke draws in the in-cylinder mixed intake gas together with fresh air. The mixed intake gas including the exhaust gas is supplied to the third cylinder. This decreases the concentration of oxygen in the combustion cylinder, in which fuel is combusted, in comparison with when only fresh air is supplied to the combustion cylinder. Thus, generation of $NO_x$ is suppressed while the fuel efficiency of the diesel engine is improved.

As mentioned above, in the deactivated cylinder during cylinder deactivation, the exhaust valve 12 is opened after the intake valve 11 is opened in the intake stroke, so that the exhaust gas is mixed with fresh air to generate the in-cylinder mixed intake gas. The fresh air and exhaust gas are agitated through the compression and expansion strokes. Thus, the agitated in-cylinder mixed intake gas is supplied to the intake passage 4 in the exhaust stroke. The mixed intake gas in which the fresh air and exhaust gas are well mixed is supplied to the combustion cylinder under normal operation in comparison with a case in which the in-cylinder mixed intake gas is supplied to the intake passage 4 without agitation. Moreover, since the temperature of the gas drawn into the deactivated cylinder is lowered, evaporation of the lubricant in the cylinder 1 is reduced while the efficiency of fuel combustion is improved.

The above embodiment provides the following advantages.

(1) The intake valve 11 and the exhaust valve 12 are opened during downstroke of the piston 6 in the deactivated cylinder during cylinder deactivation. Thus, not only the exhaust gas but also fresh air is drawn into the combustion chamber 8 of the deactivated cylinder. Since the exhaust gas at the high temperature immediately after combustion is introduced into the combustion chamber 8 of the deactivated cylinder together with fresh air, the situation is avoided in which only the exhaust gas at the high temperature immediately after the combustion is introduced into the combustion chamber 8 of the deactivated cylinder. Thus, the temperature of the gas drawn into the combustion chamber 8 of the deactivated cylinder is lowered in comparison with when only the exhaust gas at the high temperature immediately after the combustion is introduced into the combustion chamber 8 of the deactivated cylinder. Thus, evaporation of the lubricant in the combustion chamber 8 of the deactivated cylinder is reduced, and the exhaust gas is recirculated to the intake passage 4 through the deactivated cylinder.

(2) The ratio of exhaust gas in the deactivated cylinder is changed by changing the opening amounts of the intake valve 11 and the exhaust valve 12. In this way, it is possible to change the ratio of exhaust gas out of the mixed intake gas drawn into the combustion cylinder.

(3) The deactivated cylinder draws exhaust gas into the combustion chamber 8 after drawing fresh air. Thus, the exhaust gas is added to the combustion chamber 8 having the fresh air at a lower temperature. That further suppresses the temperature of the gas from rising in the combustion chamber 8 of the deactivated cylinder in comparison with when the fresh air is added to the combustion chamber 8 having the exhaust gas.

(4) The in-cylinder mixed intake gas, which contains the fresh air and exhaust gas drawn into the deactivated cylinder, is compressed and expanded, and is thereafter discharged to the intake passage 4. Thus, the in-cylinder mixed intake gas is supplied to the intake manifold 4b in a state in which the fresh air and exhaust gas are well agitated.

Second Embodiment

A control system for a diesel engine according to a second embodiment of the present invention will be described referring to FIGS. 7 to 9. The second embodiment differs from the above first embodiment in that the ECU 10 also draws air into the deactivated cylinder in the expansion stroke, and also discharges air from the deactivated cylinder in the compression stroke. The following description will focus on the dissimilarities to the first embodiment. The diesel engine of the second embodiment includes components similar to those of the diesel engine of the first embodiment.

As shown by the lower part of FIG. 7, when the crank angle is in the intake stroke, the ECU 10 opens the intake valve 11 by an opening amount that is smaller than that of the intake valve 11 under normal operation in the intake stroke. The ECU 10 then closes the intake valve 11. After that, the ECU 10 opens the exhaust valve 12 by an opening amount that is smaller than that of the exhaust valve 12 under normal operation. The ECU 10 then closes the exhaust valve 12. Thus, in the intake stroke of the deactivated cylinder, fresh air is drawn into the combustion chamber 8, and thereafter exhaust gas is drawn into the combustion chamber 8. The fresh air and exhaust gas are mixed to generate in-cylinder mixed intake gas in the deactivated cylinder.

When the crank angle is in the compression stroke, the ECU 10 opens the intake valve 11 by an opening amount that is the same as that of the intake valve 11 under normal operation in the compression stroke. The ECU 10 then closes the intake valve 11. Thus, the in-cylinder mixed intake gas, in which the fresh air and exhaust gas are mixed, is discharged from the combustion chamber 8 to the intake passage 4. In sum, unlike the compression stroke of the aforementioned first embodiment, in which the in-cylinder mixed intake gas is compressed in the deactivated cylinder, the in-cylinder mixed intake gas in the combustion chamber 8 is discharged to the intake passage 4.

When the crank angle is in the expansion stroke, the ECU 10 opens the intake valve 11 by an opening amount that is smaller than that of the intake valve 11 under normal operation. The ECU 10 then closes the intake valve 11. After that, the ECU 10 opens the exhaust valve 12 by an opening amount that is smaller than that of the exhaust valve 12 under normal operation. The ECU 10 then closes the exhaust valve 12. Thus, fresh air is drawn into the combustion chamber 8 through the intake passage 4, and thereafter exhaust gas is drawn into the combustion chamber 8 through the exhaust passage 5. The fresh air and exhaust gas are mixed to generate in-cylinder mixed intake gas in the deactivated cylinder. In sum, similar to the intake stroke, the exhaust gas and fresh air is drawn into the combustion chamber 8 once again to generate the in-cylinder mixed intake gas.

When the crank angle is in the exhaust stroke, the ECU 10 opens the intake valve 11 by an opening amount that is substantially equal to that of the intake valve 11 under normal operation. The ECU 10 then closes the intake valve 11. Thus, the in-cylinder mixed intake gas is discharged from the combustion chamber 8 to the intake passage 4.

Through the above stroke cycle, the work performed by the pressure difference between the pressure in the intake passage 4 and the pressure in the exhaust passage 5 is twice as much as that in the first embodiment. The fuel efficiency of the diesel engine is therefore further improved.

A combustion state in the cylinder under normal operation during the above cylinder deactivation will be described referring to FIGS. 8 and 9. FIGS. 8 and 9 correspond to FIGS. 5 and 6, which have been referred to in the first embodiment.

During the cylinder deactivation, the in-cylinder mixed intake gas is supplied to the intake passage 4. Through the intake manifold 4b, the in-cylinder mixed intake gas is then supplied from the deactivated cylinder to the combustion cylinder, in which fuel is combusted. In sum, when the first and fourth cylinders are in the exhaust stroke, the second and third cylinders in the intake stroke draw in the in-cylinder mixed intake gas together with fresh air. The mixed intake gas including the exhaust gas is supplied to the second and third cylinders. In the present embodiment, the deactivated cylinder under normal operation also discharges the in-cylinder mixed intake gas to the intake passage 4 in the compression stroke. That is, the in-cylinder mixed intake gas is supplied to the intake passage 4 twice during a period when one combustion is generated under normal operation. Thus, the concentration of oxygen is decreased in comparison with when supplying only fresh air. Thus, combustion is suppressed while suppressing generation of $NO_x$ and improving the fuel efficiency. Moreover, two deactivated cylinders simultaneously draw in and discharge the exhaust gas. Thus, each cylinder does not need to draw in a large amount of the exhaust gas at the high temperature.

As mentioned above, in the deactivated cylinder during cylinder deactivation, in-cylinder mixed intake gas, in which fresh air and exhaust gas are mixed, is generated in the intake and expansion strokes, and the in-cylinder mixed intake gas is discharged to the intake passage 4 in the exhaust and compression strokes. The two deactivated cylinders simultaneously draw in the exhaust gas, and the amount of exhaust gas drawn by one deactivated cylinder is smaller than that in the first embodiment. That decreases the temperature of the gas drawn into the deactivated cylinder, and reduces evaporation of the lubricant in the cylinder 1. In addition, the exhaust gas is re-circulated to the intake passage 4 through the deactivated cylinder.

The above embodiment provides the following advantage in addition to the advantages (1) to (3) of the first embodiment.

(5) In the deactivated cylinder during cylinder deactivation, the in-cylinder mixed intake gas is generated in the intake and expansion strokes, and the in-cylinder mixed intake gas is discharged to the intake passage 4 in the exhaust and compression strokes. Thus, the amount of exhaust gas drawn by one deactivated cylinder is smaller than that in the first embodiment. That decreases the temperature of gas drawn into the deactivated cylinder, and further reduces evaporation of the lubricant in the cylinder 1.

The above embodiments may be modified as follows. In the above embodiments, the valves are actuated by the cams during the normal operation, while the valves 11 and 12 are actuated by the intake and exhaust valve drive units 13 and 14 respectively, during the cylinder deactivation. However, the intake and exhaust valve drive units 13 and 14 may actuate the valves 11 and 12 respectively, during the normal operation.

In the above embodiments, the ratio of exhaust gas out of intake gas toward the combustion cylinder may be adjusted by adjusting the opening amounts of the intake and exhaust valves 11 and 12 according to the combustion state of the engine when the deactivated cylinder is in the intake stroke.

In the above embodiments, the four-cylinder engine was described as an example of an internal combustion engine. However, the internal combustion engine may be an engine having five or more cylinders. For example, in a six-cylinder engine, timings of discharging and drawing in are offset by a crank angle of 60 degrees between cylinders. Thus, the in-cylinder mixed intake gas are generated in and discharged from the deactivated cylinder to the intake manifold, and the combustion cylinder then draws in the in-cylinder mixed intake gas. This allows a greater amount of in-cylinder mixed intake gas to be supplied to the combustion cylinder.

In the above embodiments, the diesel engine was described as an example of an internal combustion engine. However, the internal combustion engine may be a gasoline engine. This configuration achieves the same advantages as described above in a gasoline engine.

In the above embodiments, the ECU 10 may control the valves such that at least one of the exhaust valve 12 and the intake valve 11 is opened by a constant amount when the deactivated cylinder is in the intake or expansion stroke.

In the above embodiments, the ECU 10 may control the valves such that the intake valve 11 opens after the exhaust valve 12 opens when the deactivated cylinder is in the intake or expansion stroke.

In the above embodiments, the exhaust valve 12 may open before the intake valve 11 closes when the deactivated cylinder is in the intake or expansion stroke. Alternatively, the intake valve 11 may open when the intake valve 11 closes. The embodiments may be just modified as long as the intake and exhaust valves 11 and 12 open during downstroke of the piston in the deactivated cylinder and only the intake valve 11 opens during upstroke of the piston in the deactivated cylinder.

The invention claimed is:
1. An engine control system for controlling an internal combustion engine to perform cylinder deactivation, which deactivates a cylinder in a multi-cylinder internal combustion engine, each cylinder including a piston, an intake valve, and an exhaust valve, wherein, in a deactivated cylinder during the cylinder deactivation, the engine control system opens both the intake valve and the exhaust valve during downstroke of the piston, and opens the intake valve and closes the exhaust valve during upstroke of the piston; and in the deactivated cylinder during the cylinder deactivation, an opening operation and a subsequent closing operation are performed by both the intake valve and the exhaust valve during the downstroke of he piston, and an opening operation and a subsequent closing operation are performed only by the intake valve during the upstroke of the piston.

2. The engine control system according to claim 1, wherein, during the downstroke of the piston in the deactivated cylinder during the cylinder deactivation, the opening operation and the subsequent closing operation of the exhaust valve are performed after the opening operation and the subsequent closing operation of the intake valve.

3. The engine control system according to claim 1, wherein the engine control system is configured to be capable of, in the deactivated cylinder during the cylinder deactivation, changing an opening amount of the intake valve during the downstroke of the piston and changing an opening amount of the exhaust valve during the downstroke of the piston.

4. The engine control system according to claim 1, wherein, in the deactivated cylinder during the cylinder deactivation, the engine control system:
opens both the intake valve and the exhaust valve during the downstroke of the piston thereby generating in-cylinder mixed intake gas, in which fresh air and exhaust gas are mixed;
compresses the in-cylinder mixed intake gas by closing both the intake valve and the exhaust valve during the subsequent upstroke of the piston;
expands the in-cylinder mixed intake gas while both the intake valve and the exhaust valve remain closed during the subsequent downstroke of the piston; and
opens the intake valve while the exhaust valve remains closed during the subsequent upstroke of the piston.

5. An engine control method for controlling an internal combustion engine to perform cylinder deactivation, which deactivates a cylinder in a multi-cylinder internal combustion engine, each cylinder including a piston, an intake valve, and an exhaust valve, the method comprising:
opening both an intake valve and an exhaust valve during downstroke of a piston in a deactivated cylinder during cylinder deactivation to generate in-cylinder mixed intake gas, in which fresh air and exhaust gas are mixed; and
opening the intake valve and closing the exhaust valve during upstroke of the piston in the deactivated cylinder during the cylinder deactivation to discharge the in-cylinder mixed intake gas from the deactivated cylinder through an intake port.

6. An engine control system for controlling an internal combustion engine to perform cylinder deactivation, which deactivates a cylinder in a multi-cylinder internal combustion engine, each cylinder including a piston, an intake valve, and an exhaust valve;
wherein, in a deactivated cylinder during the cylinder deactivation, the engine control system opens both the intake valve and the exhaust valve during downstroke of the piston, and opens the intake valve and closes the exhaust valve during upstroke of the piston, and
during the downstroke of the piston in the deactivated cylinder during the cylinder deactivation, an opening operation and a subsequent closing operation of the exhaust valve are performed after an opening operation and a subsequent closing operation of the intake valve.

* * * * *